(12) United States Patent
Gerada et al.

(10) Patent No.: US 11,745,414 B2
(45) Date of Patent: Sep. 5, 2023

(54) 3D-PRINTER SYSTEM AND 3D-PRINTING METHOD OF AN ELASTOMERICALLY DEFORMABLE RUBBER BODY, IN PARTICULAR A RUBBER SEAL

(71) Applicant: Trelleborg Sealing Solutions Germany GmbH, Stuttgart (DE)

(72) Inventors: Ivan Gerada, Naxxar (MT); Martin Hignett, Madliena (MT)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 59 days.

(21) Appl. No.: 17/643,180

(22) Filed: Dec. 8, 2021

(65) Prior Publication Data

US 2022/0097293 A1 Mar. 31, 2022

Related U.S. Application Data

(63) Continuation of application No. PCT/EP2019/065171, filed on Jun. 11, 2019.

(51) Int. Cl.

| | |
|---|---|
| *B29C 64/194* | (2017.01) |
| *B29C 64/295* | (2017.01) |
| *B29C 64/124* | (2017.01) |
| *B29C 64/209* | (2017.01) |
| *B29C 64/227* | (2017.01) |
| *B29C 64/40* | (2017.01) |
| *B33Y 50/02* | (2015.01) |
| *B29C 64/393* | (2017.01) |
| *B29C 64/188* | (2017.01) |
| *B33Y 40/00* | (2020.01) |
| *B33Y 10/00* | (2015.01) |
| *B33Y 70/00* | (2020.01) |

(Continued)

(52) U.S. Cl.
CPC .......... *B29C 64/124* (2017.08); *B29C 64/188* (2017.08); *B29C 64/194* (2017.08); *B29C 64/209* (2017.08); *B29C 64/227* (2017.08); *B29C 64/295* (2017.08); *B29C 64/393* (2017.08); *B29C 64/40* (2017.08); *B33Y 40/00* (2014.12); *B33Y 50/02* (2014.12); *B29K 2021/00* (2013.01); *B29L 2031/26* (2013.01); *B33Y 10/00* (2014.12); *B33Y 70/00* (2014.12)

(58) Field of Classification Search
CPC ........................... B29C 64/188; B29C 64/194
See application file for complete search history.

(56) References Cited

U.S. PATENT DOCUMENTS

| | | | |
|---|---|---|---|
| 9,126,365 B1 * | 9/2015 | Mark | ...................... B29B 15/12 |
| 11,318,670 B2 | 5/2022 | Matzner et al. | |

(Continued)

FOREIGN PATENT DOCUMENTS

| | | |
|---|---|---|
| CN | 104761761 A | 7/2015 |
| CN | 107116730 A | 9/2017 |

(Continued)

*Primary Examiner* — Atul P. Khare
(74) *Attorney, Agent, or Firm* — Orbit IP

(57) ABSTRACT

Disclosed is a novel 3D-printer system for printing elastically deformable rubber parts such as rubber seals where the uncured rubber source material is partially cured before printing each rubber layer of the rubber part. Furthermore, disclosed is a novel 3D printing method for 3D-printing an elastically deformable rubber body using the 3D-printer system.

4 Claims, 8 Drawing Sheets

(51) Int. Cl.
   *B29K 21/00*     (2006.01)
   *B29L 31/26*     (2006.01)

(56) References Cited

U.S. PATENT DOCUMENTS

2016/0107379 A1* 4/2016 Mark .................... B29C 64/188
                                                           700/98
2016/0145452 A1   5/2016 Fong et al.
2018/0029290 A1   2/2018 Bottiglio et al.

FOREIGN PATENT DOCUMENTS

| | | |
|---|---|---|
| CN | 107283819 A | 10/2017 |
| CN | 109 414 862 A | 3/2019 |
| CN | 109414873 A | 3/2019 |
| CN | 109476148 A | 3/2019 |
| JP | 2005342998 A * | 12/2005 |
| JP | 2019 018440 A | 2/2019 |
| JP | 2019-084779 A | 6/2019 |
| JP | 2019-516582 A | 6/2019 |
| JP | 2019-518864 A | 7/2019 |
| KR | 10 2016 0107769 A | 9/2016 |
| KR | 20160124554 A * | 10/2016 |
| RU | 2002626 C1 | 11/1993 |
| WO | 2013/142562 A2 | 9/2013 |
| WO | 2017/038984 A1 | 3/2017 |
| WO | 2017/152142 A1 | 9/2017 |
| WO | 2017/205196 A1 | 11/2017 |
| WO | 2018/007579 A1 | 1/2018 |
| WO | WO-2018066721 A1 * | 4/2018 |

* cited by examiner

3D-PRINTER SYSTEM AND 3D-PRINTING METHOD OF AN ELASTOMERICALLY DEFORMABLE RUBBER BODY, IN PARTICULAR A RUBBER SEAL

CROSS-REFERENCE TO RELATED APPLICATIONS

This continuation application claims priority to PCT/EP2019/065171 filed on Jun. 11, 2019 which has published as WO 2020/249189 A1, the entire contents of which are fully incorporated herein with this reference.

DESCRIPTION

Field of the Invention

The invention refers to a 3D-printer system and a Method of 3D-printing of an elastomerically deformable rubber body, in particular a rubber seal.

Background of the Invention

The use of synthetic as well as natural rubber products are securely established in a huge range of technical applications such as, for instance, the field of sealing technology. The rubber products need to be vulcanized to harden the rubber which can be defined as the curing of the rubber. Curing works by forming chemical cross-links between sections of polymer chains which results in increased rigidity and durability, as well as other changes in the mechanical properties of the rubber. The curing of rubber is generally irreversible and can be achieved by application of heat. Typically, nitrile based rubbers such as acrylonitrile butadiene rubber, are used, e.g., in the field of sealing technology. Injection molding is the most widely used method for an industrial production of elastomerically deformable rubber parts. 3D-Printing of rubber parts which have to meet high requirements with respect to their dimensional acuracy and elastic properties, in particular rubber seals (gaskets) and the like, has failed to date.

It is, therefore, the object of the invention to provide a 3D-printer system which allows for printing elastomerically deformable rubber parts which show material characteristics and a dimensional accuracy comparable to that of a corresponding injection-molded rubber part. It is a further object of the invention to provide a 3D-printing method suitable to produce said rubber parts at low reject rates.

SUMMARY OF THE INVENTION

The 3D-printer system according to the invention is specified in the claims. The method of 3D-printing of an elastomerically deformable rubber part, such as a rubber seal, comprises the method steps as per the claims.

The 3D-printer system according to the invention allows for printing of an elastically deformable rubber body or part, in particular a rubber seal. The 3D-printer system comprises:
- an extruder having a housing with an inlet opening and a nozzle, the extruder comprising first heating means for heating raw rubber R fed to the extruder via the inlet opening;
- a print bed with second heating means;
- driving means for moving the extruder and the print bed relative to one another; and
- an electronic control for the extruder and the second heating means of the print bed, wherein the electronic control is adapted to control the extruder and the first heating means such that the rubber is partially cured within the extruder and said partially cured rubber r is extruded over the nozzle and deposited on the print bed during operation of the 3D printer system and such that the deposited partially cured rubber r is further cured during and after the rubber part has been printed on the print bed.

The 3D-printer system according to the invention allows to print rubber parts which show material characteristics and a dimensional accuracy comparable to that of corresponding injection-molded rubber parts. Due to the fact that the electronic control is adapted, in particular programmed, that (only) already partially cross-linked or partially cured rubber is extruded from the extruder, the extruded rubber already shows a sufficient dimensional stability to not run on the print bed. This is essential for the dimensional stability and dimensional accuracy of the rubber part. Once deposited on the heated print bed, the heated print bed allows for a continued curing process. Advantageously, the temperature of the print bed and/or surrounding atmosphere is tightly regulated by the electronic control. It is to be understood, that each layer of partially cured rubber is deposited on the previous one at a point in time when the previous one still allows for forming a sufficient number of cross-links with the rubber layer newly deposited on top of it. The 3D-printer system fills a gap where precision rubber parts are needed in small numbers.

According to a preferred embodiment of the 3D-printer system, the extruder is designed as a worm extruder, in particular a single-worm extruder. Such worm extruders, in particular single-worm extruders, can be realized in a structurally simple and mechanically sufficiently robust way. Further, a single-worm extruder allows both for a reliable mixing as well as heating of the raw rubber material used for the 3D-printing process.

Polymers such as heated rubber show a shear-thinning when exposed to shear strain, that is a non-Newtonian behavior. The viscosity of these polymers decreases under shear strain. This behavior needs to be taken into account with respect to the construction of the extruder. With respect to this, in an inlet or feed zone of the extruder which has the inlet opening, the worm, according to the invention, preferably either contacts the interior surface of the housing wall of the extruder or is minimally spaced from said interior surface forming a (first) gap in between the interior surface of the housing wall and the worm, whereas there is a (second) gap provided in a heating and mixing zone between the worm and the interior surface of the housing. This (second) gap is advantageously larger than the first gap in the region of the inlet zone of the extruder. By this, the heated rubber can be forced in direction towards the nozzle (forward flow) of the extruder by rotation of the worm and, in the heating and mixing zone of the extruder, partially flow backwards (backflow) across the said second gap. This greatly improves mixing and degassing of the heated rubber within the heating and mixing zone of the internal chamber of the extruder. Further, this facilitates a defined partial curing of the heated rubber due to a sufficient time of exposure to the heat generated by the first heating means of the extruder as well as due to the additional shear-strain exerted on the heated rubber during the backflow thereof and the mixing process. Overall, extrusion of bubble-free and very homogeneously mixed partially cured rubber can thereby be realised.

According to a preferred embodiment of the invention, the worm is, at least in the feed or inlet zone of the extruder, provided with serrated thread edges. The raw rubber material can thereby be actively cut into pieces (shredded) and dragged further into the extruder, where it is being heated and mixed. There are no further feeding devices necessary for supply of the raw rubber material once located in the intake zone. The serrations of the thread edges may have cutting edges to further facilitate shredding of the raw rubber.

According to the invention, the first heating means of the extruder can be arranged within a housing wall of the housing of the extruder. Thereby, the first heating means are both protected against mechanical damage and a reliable heating of the raw rubber is facilitated. The first heating means may, for instance, be arranged within a channel or groove disposed in the housing wall of the extruder directly confining the mixing chamber.

A very homogenous heating of the raw rubber can be realized if the first heating means are at least partially encompassing an internal chamber of the extruder in which the worm is arranged.

For the monitoring and control of the heating, mixing and partial curing of the rubber inside the extruder, the electronic control preferably comprises at least a first temperature sensor which is arranged in or on the extruder. The said first temperature sensor may, for instance, be arranged in a recess of the housing wall of the extruder. The electronic control preferably comprises a further temperature sensor for determining and regulating the temperature of the print bed or of an atmosphere directly surrounding the print bed.

Further, the electronic control preferably comprises at least one pressure sensor located in the extruder for determining an operating pressure within the internal chamber during operation of the 3D-printer system.

The electronic control is preferably freely programmable such that the 3D-printer system can be adjusted to the 3D-printing of different rubber parts quickly and with low effort. By this, the potential broadness of application of the 3D-printer system can be further increased. The electronic control may, for instance, comprise a computer with a respective operating software and a 3D-printing application software stored on it's memory device. Also, with regards to industry 4.0 and data exchange in industry, the necessary 3D-printing software as well as construction parameters defining the rubber part to be printed can be stored and made available for use in a so-called cloud.

The print bed, according to the invention, is preferably made from glass, a resin or technical ceramics. According to the invention, the surface of the print bed is advantageously designed in such a way that the print bed both provides a sufficient friction engagement of the partially cured rubber directly deposited on the print bed and further facilitates disengagement of the fully cured rubber body when its being removed from the print bed. For instance, the surface of the print bed may show microdepressions, e.g., microfissures, or microprotrusions by which the contact surface of the print bed with the extruded rubber deposited thereon can be reduced.

The second heating means of the print bed, according to a further embodiment of the invention, is positioned at least partially underneath and/or at least partially within the print bed. This allows for a quick, and reliable temperature control of the print bed to allow for a defined curing of the extruded partially cured rubber deposited thereon.

The first heating means of the extruder and/or the second heating means of the print bed preferably comprise one or more electrical resistance heating elements. Electrical resistance heating elements are readily available in a wide range of designs and performance classes on the market at low cost. Said electrical resistance heating elements allow for a very responsive control of the rubber arranged inside the extruder or extruded on the print bed.

According to a preferred embodiment of the invention, the print bed is disposed within an, preferably air-tight, encasement. This reduces the energy demand for the printing process. Further, the print bed can be exposed to a controlled atmosphere which may differ from the ambient atmosphere of the 3D-printer system. For instance, exposure of the extruded partially cured rubber deposited on the print bed to an atmosphere consisting of more than 95% of an inert gas such as, for instance, nitrogen, may be desirable to decrease unwanted oxydation effects during the printing and/or curing process of the rubber part right on the print bed. Also, moisture within the encasement can be kept at an optimal target value. If the encasement is designed to provide a pressure chamber, the deposition and curing of the partially cured rubber on the print bed can be carried out under an elevated temperature and pressure different from ambient air pressure. For instance, the rubber material deposited on the print bed can thereby be subjected to pressurized saturated steam to further expedite the curing process.

According to a further embodiment of the invention, at least part of the second heating means are arranged in or on the encasement. This allows heating the partially cured rubber deposited on the print bed from the side and/or above.

According to a further embodiment of the invention, at least part of the second heating means may be designed as radiator fans. The radiator fans may be, in particular, arranged below the print bed or on the said encasement and be provided with air ducts to guide the warm/hot air from the radiator fans to the top side of the print bed.

According to a preferred embodiment of the invention, the 3D-printer comprises a second print head for printing support structures or placeholder structures for the elastically deformable rubber part to be printed. The said supportive or placeholder structures need to be printed of a more rigid material than the elastic rubber material of the rubber body to be printed. Therefore, the second print head is structured and arranged for extrusion of a support/placeholder material such as, for instance, a thermoplastic material, e.g., polyactic acid, or a suitable thermoset. Both the first and second extruder or print heads are preferably controlled by the electronic control. The support structure can, for instance, serve as a support for otherwise unsupported protrusions of the rubber part to be formed. Also, the support structure may serve as a lateral support or even as a containment for the rubber part to be formed on the print bed. By this, a smoother surface finish of the rubber part may be realized if needed. The said support structure can also serve to generate microstructures on the surface of the rubber part which may be difficult to create otherwise. It needs to be noted that the support structure may alternatively serve as a reinforcement of the rubber part which remains embedded therein for good. In this case, the rubber part is designed as a multi-component part.

The first and second print head, according to the invention, can be preferably actuated independently of one another. The extruder and the second print head each can be shifted from an active printing position to an idle position and vice versa relative to the print bed. Only the extruder or the second print head can be positioned in the active printing position at a time. Thereby, collisions of the extruder/second print head with each other or with the layers of partially cured rubber already deposited on the print bed can be easily avoided during operation of the 3D-printing system.

According to the invention, the method of 3D-printing an elastically deformable rubber body, in particular a rubber seal, using a 3D-printer comprising an extruder and a first print head having an outlet nozzle, comprises the following steps:

- providing uncured raw rubber R in the form of strips, pellets or the like;
- feeding the uncured raw rubber to the extruder via the inlet opening;
- heating the uncured raw rubber within the extruder by application of heat and mixing the heated rubber within the extruder;
- partially curing the heated raw rubber R within the extruder;
- heating the print bed;
- forming a first layer of partially cured rubber r by extruding partially cured rubber over the nozzle of the extruder and depositing the extruded partially cured rubber r on the print bed while moving the extruder and the print bed relative to one another;
- printing subsequent layers of partially cured rubber r by extruding further partially cured rubber r over the nozzle and depositing the extruded rubber on top of the respective immediately preceding layer of partially cured rubber r when moving the nozzle and the print bed relative to one another at a pre-set distance, wherein the distance is such that the newly extruded partially cured rubber r is mechanically squashed into the respective immediately preceding layer of partially cured rubber r;
- further curing each of the rubber layers once deposited on the print bed and until the 3D-printed rubber body cured to the desired state of cure on the print bed.

The 3D-printing method of an elastically deformable rubber body according to the invention allows manufacture of rubber parts that show material characteristics and a dimensional accuracy comparable to that of corresponding injection-molded rubber parts. There is no need for expensive moulds which are necessary in injection moulding, therefore, even a single copy or small numbers of identical rubber parts can be manufactured in a cost-effective way.

The partial pre-vulcanisation of the heated rubber within the extruder allows for a precise deposition of the extruded partially cured rubber without the risk of drooling, splattering or running which would jeopardize a dimensional accuracy of the rubber body (part) to be formed. Further, the viscosity of heated unvulcanized rubber decreases when subjected to shear strain inside the extruder. This non-Newtonnian behavior can be counteracted by the partial curing of the heated rubber inside the extruder. By this, the control of the extrusion of the rubber is facilitated. Further, an unwanted phase breakdown of the heated rubber and possible further compounds or additives included therein can thereby be prevented. The risk of a non-homogenous material composition of the rubber extruded from the nozzle and thus of a non-homogenous material composition as well as non-homogenous material characteristic of the rubber part to be formed can thereby be reduced.

Further, by partially squashing the extruded rubber into the respective directly preceding layer of rubber, the bonding between the respective layers of the partially cured rubber can be significantly increased. By this, an improved mechanical stability as well as homogenous material characteristic of the 3D-printed rubber body can be ensured. Also, the squashing exerts a further shear strain on the partially cured rubber both of the newly deposited rubber as well as the layer of rubber right underneath. This promotes local curing of the rubber in the contact zone of the two layers. The further curing of the rubber, once deposited on the print bed, is continued by application of heat, the already printed rubber layers are further dimensionally stabilized while the printing process is continued.

According to a preferred embodiment of the invention, the heated rubber is partially cured within the extruder only by applying heat and mechanical mixing thereof within the extruder. This allows for a precise control of the partial curing of the heated raw rubber within the extruder and a simple constructional design of the extruder as well.

The 3D-printing method according to the invention may further comprise the step of advancing the extruder towards the print bed, at the very end of printing each layer on the print bed. Thereby, an unwanted deformation of the newly deposited layer and/or respective immediately preceding layer of partially cured rubber material can be prevented. In particular, an unwanted dehiscence of the newly deposited layer of partially cured rubber from the print bed or the respective immediately preceding layer of partially cured rubber material can be prevented.

The advancing step is preferably performed before the extruding of the partially cured rubber is interrupted and the print head is moved in a direction facing away from the print bed.

According to a further preferred embodiment of the invention, for each interruption of the extrusion of the partially cured rubber, an operating pressure exerted on the partially cured rubber within the extruder may be reduced under the control of the electronic control. Thereby, an unwanted leakage of partially cured rubber from the nozzle of the extruder can be prevented when idle.

According to further preferred embodiment of the invention, the 3D-printing method is characterized by the further step of creating a support structure for any or all of the layers of the uncured rubber by printing and hardening a thermoplastic material or a thermoset or other kind of suitable material on the print bed. This allows for a 3D-printing of rubber parts of basically any geometrical design.

Further advantages of the present invention are found in the detailed description of the invention as well as in the drawing. It needs to be noted that the embodiments of the invention shown in the drawing as well as described in context therewith are merely exemplary in nature and serve for a better understanding of the invention.

DETAILED DESCRIPTION OF THE PREFERRED EMBODIMENTS

Figure 1:
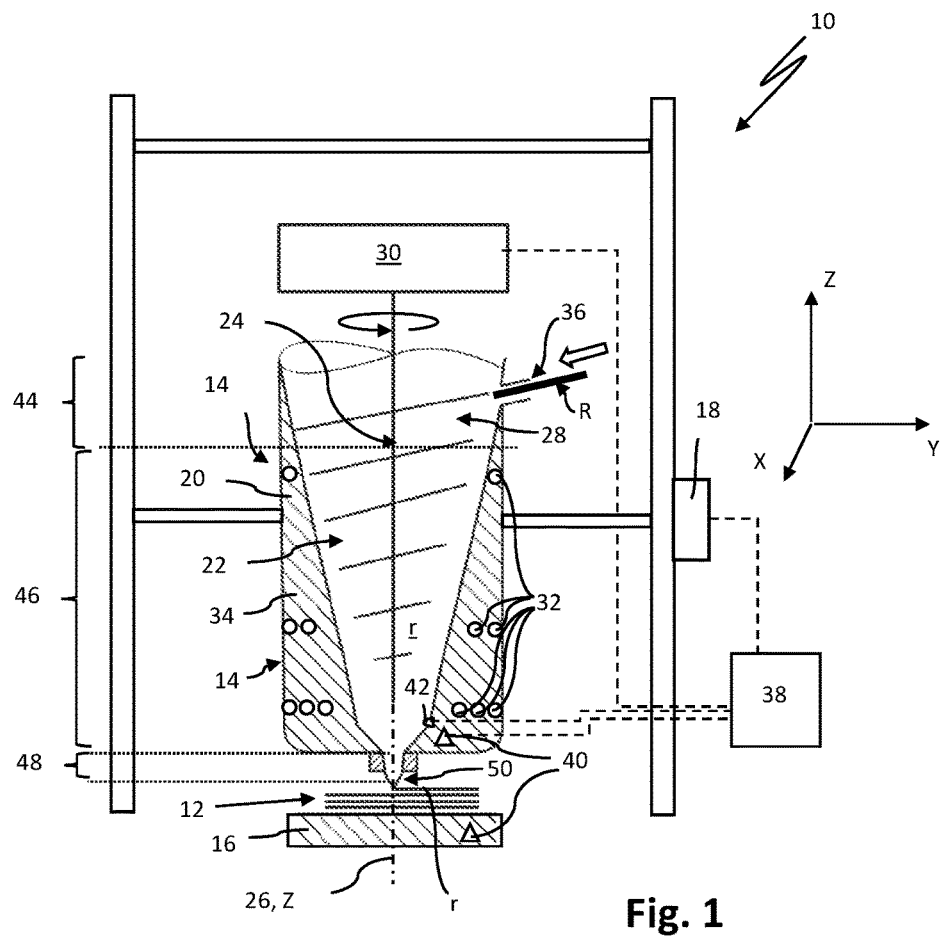
FIG. 1 shows a 3D-printer system for printing a rubber body, in particular a rubber seal, comprising an electronically controlled single worm extruder for heating, mixing and partially curing rubber strings fed to the extruder.

FIG. 1 depicts first embodiment of a 3D-printer system 10 according to the invention in a schematic view. The 3D-printer system 10 serves to print elastically deformable rubber parts or bodies 12 such as, for instance, rubber seals. The 3D-printer system 10 comprises a first print head in the form of an extruder 14 and a print bed 16 on which the respective rubber part 12 is to be printed. The extruder 14 is translationally movable relative to the print bed 16 along three axis X, Y, Z by a driving means 18.

The extruder 14 is designed as a single-worm extruder 14 and comprises a housing 20 with an internal chamber 22 in which a single worm 24 is rotatably arranged around rotational axis 26. The worm 24 preferably has a single start thread 28. and is powered by an electrical motor 30.

The extruder housing 20 features first heating means 32. The first heating means 32 are preferably arranged within the housing wall 34 and can be formed as electrical resistance heating means. Each of the first heating means 32 at least partially encompasses the internal chamber 22 of the extruder 14 to enable a homogenous heating of the raw rubber R fed into the internal chamber 22 via inlet opening 36 of the extruder 14. The print bed 16 features second heating means not shown in FIG. 1 and which will be described further below.

The 3D-printer system 10 further comprises a programmable electronic control 38. The electronic control 38 comprises at least one temperature sensor 40 for determining the temperature of the heated rubber material inside the extruder and a pressure sensor 42 for determining the operating pressure within the extruder 14. The electronic control serves to control the driving means, the electrical motor 30 of the worm 24 as well as the first heating means 32 and second heating means of the print bed 16. The electronic control 38 may, in particular, comprise a computer such as a workstation or a personal computer having a storage device on which an operation software as well as an application software for controlling the 3D-printing process are stored (not shown in the FIGS.).

The extruder 14, in the direction of the rotational axis 26, shows an upper feed or inlet zone 44 which includes the inlet opening 36, a heating and mixing zone 46 and a lower extrusion zone 48. The lower extrusion zone 48 features a nozzle 50 which serves to dispense, that is to extrude, the heated and partially cured rubber, which is designated r in the drawings.

Figure 2:
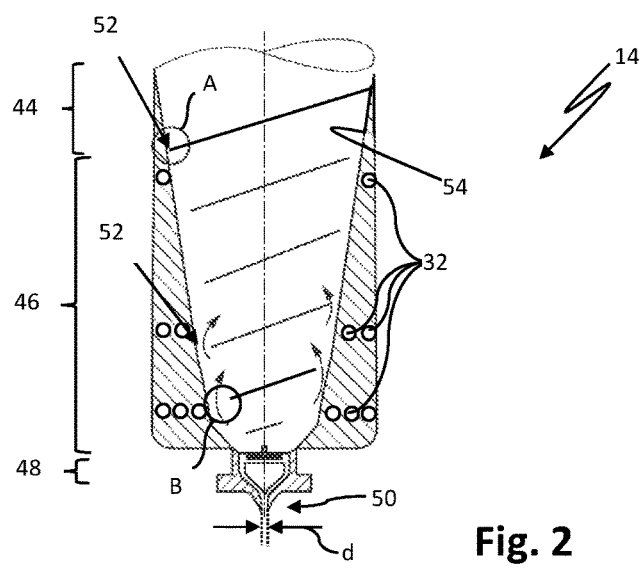
FIG. 2 shows a more detailed view of the extruder of the 3D-printing system according to FIG. 1.

In FIG. 2, the extruder 14 of the 3D-printer system is shown in an isolated partial view. It is understood that the opening diameter d of the nozzle 46 used for extrusion of the heated and partially cured rubber r is selected depending on the dimensioning of the rubber body to be printed. The partial curing of the heated raw rubber R is achieved by the application of heat as well as the mixing thereof within the internal chamber 22 of extruder 14.

Figure 3:
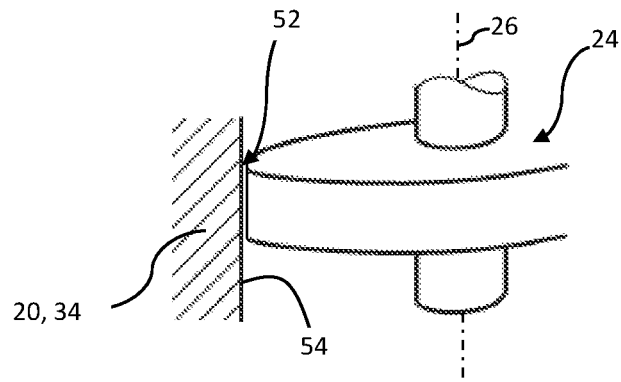
FIG. 3 shows a detailed partial view of the single worm of the extruder in the area identified as "A" in FIG. 2.

The extruder 14 is adapted to the known shear-thinning of heated (and uncured) rubber, that is to the non-Newtonian behavior of heated raw rubber R when exposed to shear strain. As to this, in the inlet zone 44 of the extruder 14, there is no or only a small gap 52 between the worm and the interior surface 54 of the housing wall 34, as is shown in greater detail in FIG. 3. This allows a building up of an operating pressure inside the internal chamber 22 needed for extruding the partially cured rubber r.

Figure 4:
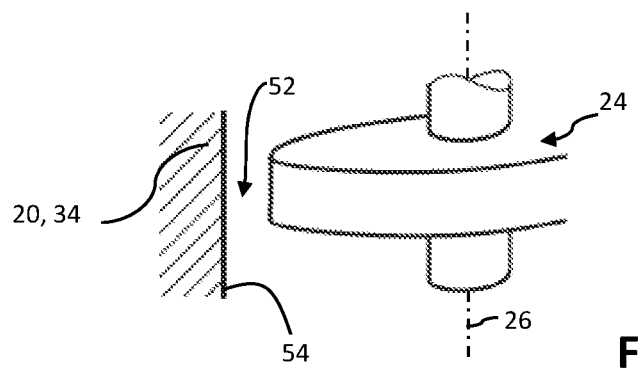
FIG. 4 shows a detailed partial view of the single worm of the extruder in the area identified as "B" in FIG. 2.

In contrast to this, in the heating and mixing zone 46 as well as in the extrusion zone 48, there is a larger gap 52 between the worm 24 and the interior surface 48 of the housing wall 34 which may further increase in size in the direction towards the nozzle 50, see FIG. 4. By this, the heated rubber can be forced in an axial direction towards the nozzle 50 (forward flow) of the extruder 14 by rotation of the worm 24 and partially flow backwards (backflow) across the gap 52. This greatly improves mixing of the heated rubber within the heating and mixing zone of the internal chamber 22 of the extruder 14. Further, this causes a defined partial curing of the heated rubber due to a sufficient time of exposure thereof to the heat generated by the first heating means 32 of the extruder 14 as well as due to the shear-strain exerted on the heated rubber during the mixing process.

Figure 5:
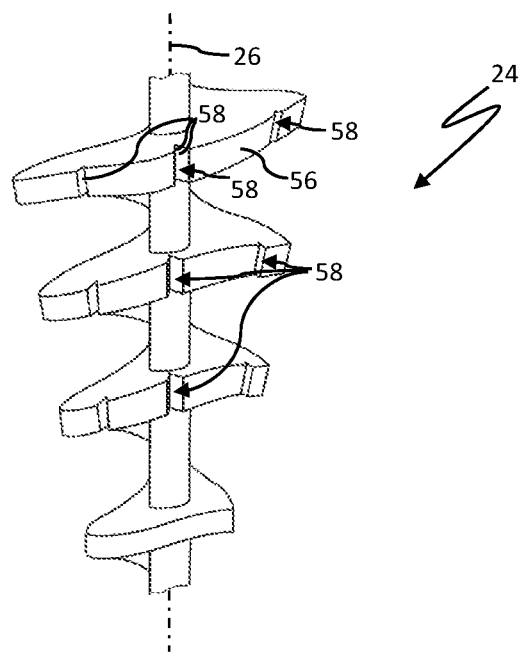
FIG. 5 shows a side view of a preferred embodiment of the worm of the single worm extruder shown in FIG. 1.
Figure 6:
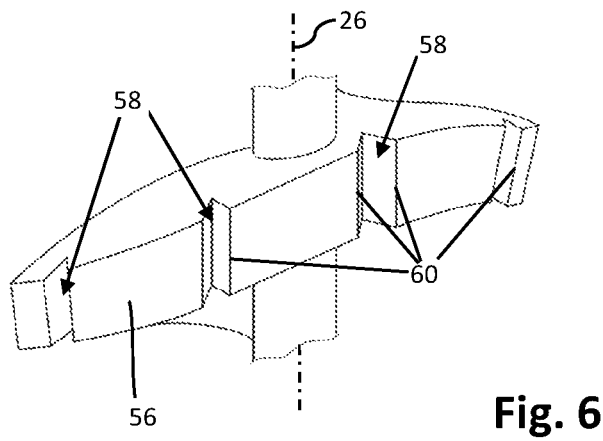
FIG. 6 shows a partial side view of the worm as depicted in FIG. 5.

The worm 24 preferably has serrated thread edges 56 as shown in FIGS. 5 and 6 such that string-type raw rubber material which is fed to the extruder 14 is caught by the serrations 58 of the thread edges 56 and dragged right into the internal chamber 22 by the rotating worm 24. The serrations 58 may be provided with cutting edges 60. This allows additional shredding of the raw rubber string fed to the extruder 14. This facilitates a quick and homogenous heating of the raw rubber R inside the extruder 14.

Figure 7:
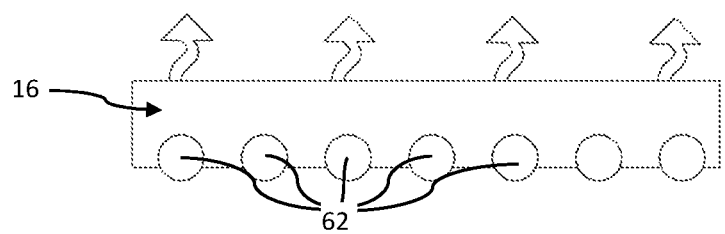
FIG. 7 shows a side view of a first embodiment of the print bed of the 3D-printer system according to FIG. 1.

In FIG. 7, there is shown a side view of a first embodiment of the print bed 16 of the 3D-printer system 10 according to FIG. 1. The second heating means 62 of the print bed 16 are located underneath the print bed 16 and may be partially or wholly embedded inside the material of the print bed 16. The print bed 16 preferably consists of a material known to be a good heat conductor, such as a metal or a technical ceramic. The second heating means 62 may, in particular, be formed as electrical resistance heating means.

Figure 8:
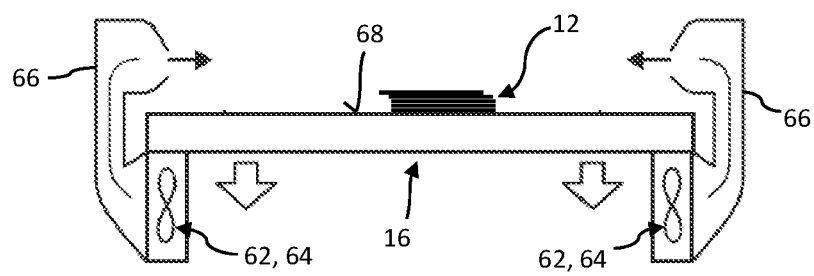
FIG. 8 shows a side view of a further preferred embodiment of the print bed of the 3D-printer system according to FIG. 1.

According to the embodiment of the print bed 16 depicted in FIG. 8, the second heating means 62 may alternatively or additionally comprise one or more heater fans 64 by which a draft of warm/hot air can be generated. There may be air ducts 66 provided to guide the warm/hot air directly to the top side 68 of the print bed 16 and the printed rubber part (body) 12 deposited thereon during the 3D printing process. This allows further curing of the printed rubber material from the outside to the inside. The heater fans 64 can be positioned underneath the print bed 16 to provide enough clearance for the extruder 14.

Figure 9:
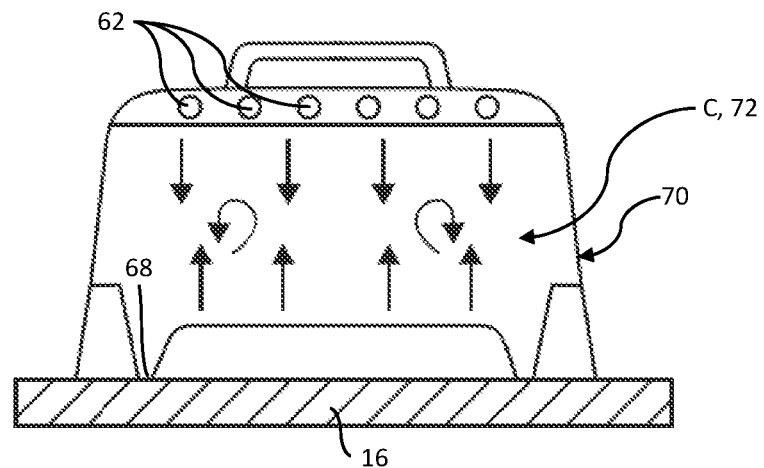
FIG. 9 shows a side view of a further embodiment of the print bed of the 3D-printer system according to FIG. 1.
Figure 10:
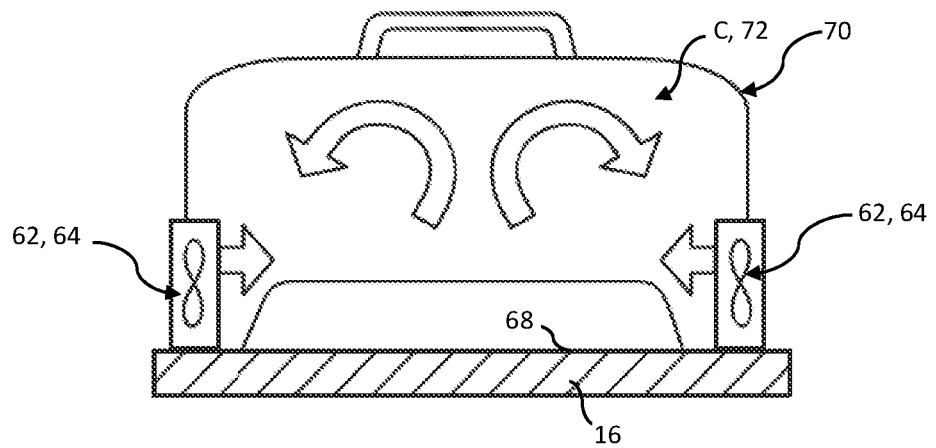
FIG. 10 shows a side view of a further embodiment of the print bed of the 3D-printer system according to FIG. 1.

The 3D-printer system 10 may further comprise an encasement 70 defining a printing chamber 72 with the print bed 16 arranged therein as is illustrated by way of example in FIGS. 9 and 10. The encasement 70 allows to expose the print bed to an atmosphere C which can be controlled more easily, in particular with respect to its temperature, humidity and/or composition of gases. For instance, exposure of the printed, that is extruded, partially cured rubber to an atmosphere C consisting of more than 95% of an inert gas may be desirable to decrease unwanted oxygen effects during the printing and curing process of the rubber part. The temperature level of the atmosphere C within the encasement 70 can be adjusted more easily and very cost-effective to a given target temperature suitable for further curing of the extruded/printed rubber within the printing chamber 72 as compared to a factory hall or production room. Of note, the encasement 70 may additionally or alternatively be provided with second heating means 62 for further curing of the printed rubber part (body) 12 of partially cured rubber r. The second heating means 62 may be arranged on the central portion of the encasement 70 and may, for instance, comprise one or more infrared radiators.

According to the embodiment of the print bed 16 shown in FIG. 10, the second heating means 62 of the encasement 70 may comprise one or more heating fans 64 which are directly mounted to the encasement, in particular a side wall 74 thereof, and form an integral part thereof.

Figure 11:
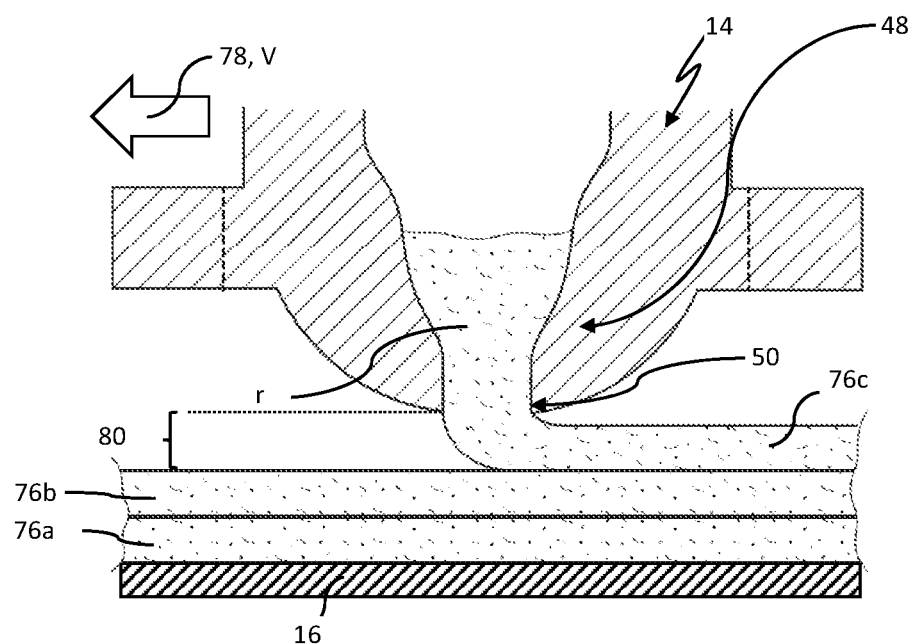
FIG. 11 shows a partial cross-sectional view of the nozzle of the extruder of the 3D-printer system according to FIG. 1.

FIG. 11 shows a detailed partial section of the nozzle 50 of the extruder 14 according to FIG. 2 during extrusion of heated and partially cured rubber r on the print bed 16. Several layers 76a, 76b, 76c, . . . , 76n of partially cured rubber r are deposited one on top of each other. Here, a first and second layer 76a, 76b of the rubber are already completed with the third layer 76c just being formed. The first rubber layer 76a is directly deposited on the print bed 16 and in direct contact therewith. Further partially cured rubber r is being extruded from the extruder and deposited directly on top of the respective preceding (second) rubber layer while the nozzle 50 of the extruder 14 is moved relative to the print bed 16 in a pre-set direction 78.

The nozzle 50 is kept at a pre-set distance 80 from the respective immediately preceding layer 76 a, 76b of partially cured rubber r during the extruding of the partially cured rubber r from the extruder 14 and at a pre-set velocity V. The pre-set distance 80, the velocity V of the movement of the extruder relative to the print bed 16 as well as the volume flow rate of the partially cured rubber r are determined in such a way that the partially cured rubber r, upon its extrusion, is mechanically squashed into the respective immediately preceding layer 76a, 76b, 76c, . . . , 76n of partially cured rubber r during deposition thereof on the said layer 76a, 76b, 76c, . . . , 76n of partially cured rubber r. This greatly enhances curing and thus an improved bonding of the various layers 76a, 76b, 76c, . . . , 76n of rubber during the 3D printing process. As a result, the 3D-printed rubber part can be realised with a mechanical stability which corresponds to the mechanical stability of rubber parts made by an injection molding process. Unwanted cavities or a dehiscence of layers can be prevented. Further, the dimensional stability of the printed layers of the partially cured rubber can thereby be increased. It needs to be noted, that the curing of the rubber is continued throughout the printing process and beyond. The completely 3D-printed rubber part remains on the print bed 16 until cured to a desired state of cure, that is a crosslink density as desired. This may take several hours.

Figure 12:
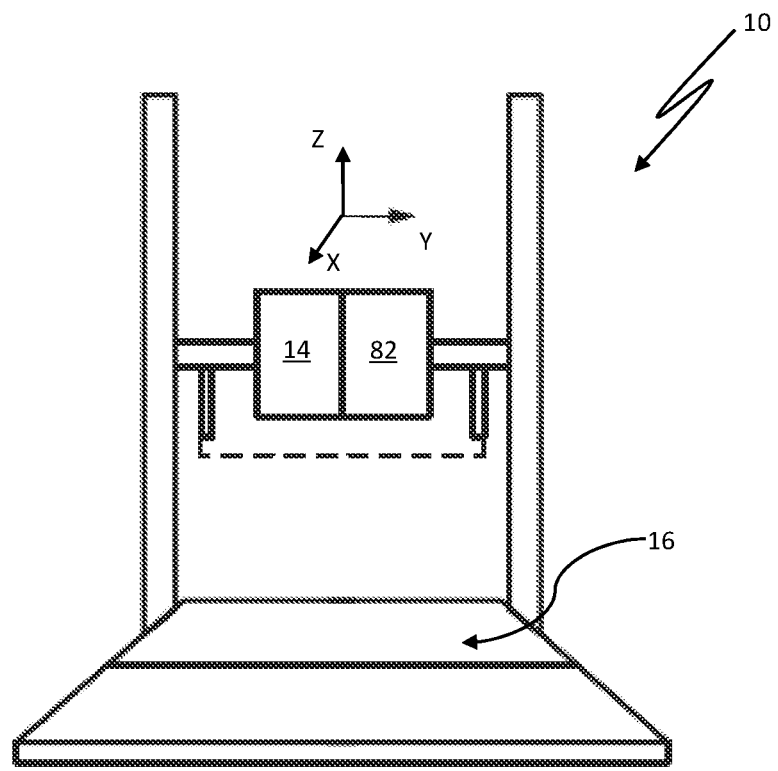
FIG. 12 shows a second embodiment of a 3D-printer system having a pair of print heads each comprising an extruder.
Figure 13:
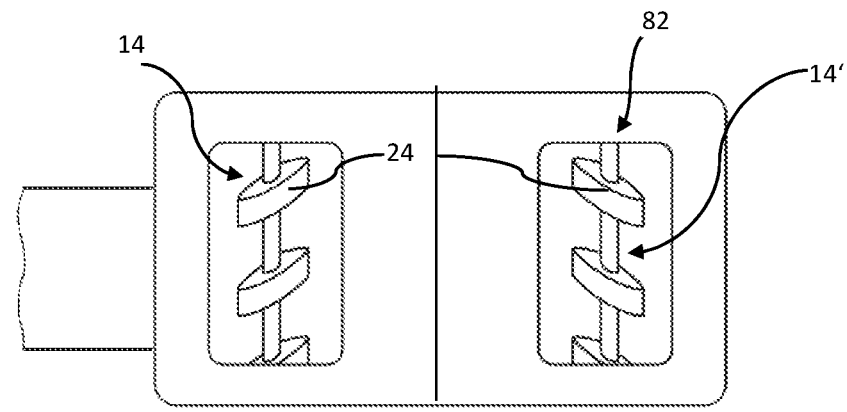
FIG. 13 shows a partially broken view of the extruder housings of the two extruders of the 3D-printer system according to FIG. 12.
Figure 14:
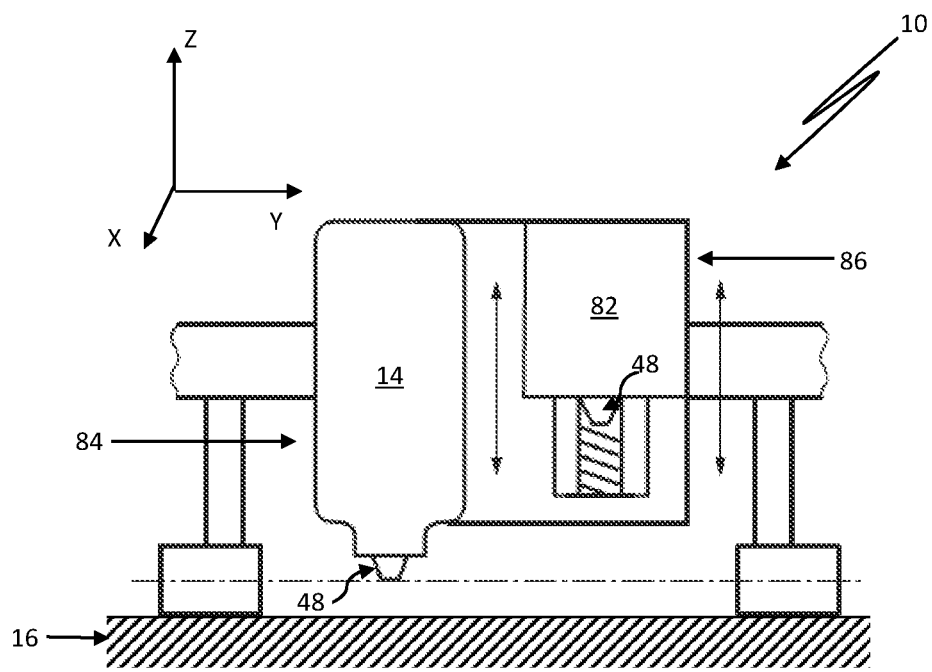
FIG. 14 shows a schematic view of the extruders of the 3D-printer system according to FIG. 12.

Reference is now made to FIG. 12 which depicts a further embodiment of a 3D-printer system 10 which features a second print head 82. The second print head 82 serves to print support and/or placeholder structures for the rubber part to be printed by the first extruder 14 on the print bed 16. As shown in FIG. 13, the second print head 82 may also comprise a worm extruder 14', in particular a single-worm extruder 14', with first heating means 32 as described above. The second print head 82 is movable along the three movement axes X, Y, Z just as the extruder 14 as has been described above with reference to FIG. 1. According to FIG. 14, either the extruder 14 or the second print head can be placed in an active printing position 84 with respect to the print bed 16 at a time. In FIG. 14, the extruder 14 is shown positioned in said active printing position 84. The second print head 82 is shown in its idle position 86. The active and the idle position 84, 86 of the extruder 14/second print head 82 are spaced from one another in the Z direction. The respective print position as well as the respective idle position are preferably freely programmable and dynamically adjustable during the 3D-printing process of a rubber part.

Figure 15:
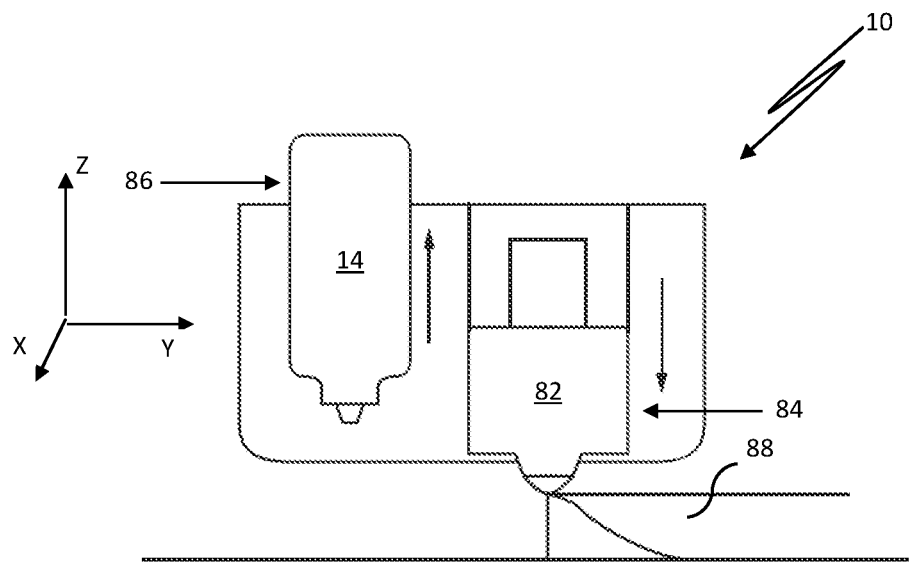
FIG. 15 shows a schematic view of the extruders of the 3D-printer system according to FIG. 12 during printing of a support structure from a thermoplastic or a thermoset.
Figure 16:
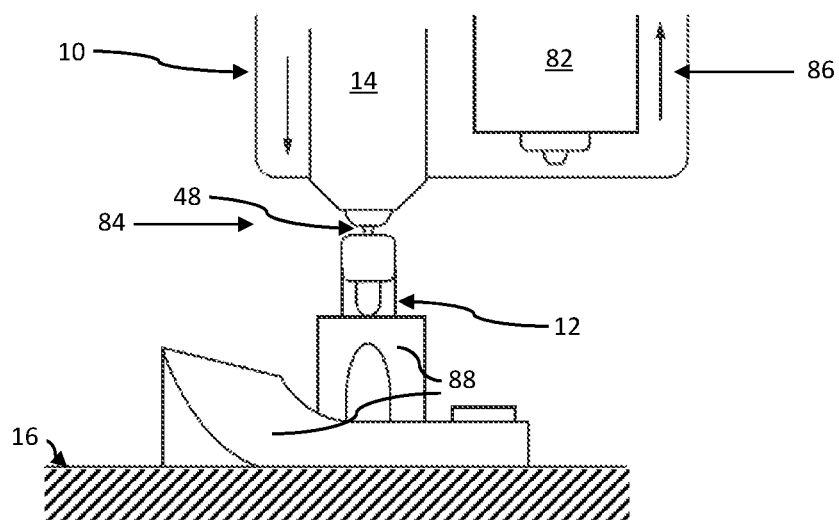
FIG. 16 shows a schematic view of the extruders of the 3D-printer system according to FIG. 12 during printing of the elastically deformable rubber part.

In FIG. 15, the 3D-printer system 10 is shown during the printing of a support structure 88 for the rubber part that is to be printed on the 3D printing system 10. The support structure 88 may be directly printed on the print bed 16. Alternatively, the support structure 88 may be at least partially positioned on a rubber layer (see FIG. 11) previously extruded and (directly or indirectly) deposited on the print bed 16. The support structure 88 is preferably printed from a thermoplastic or a thermosetting polymer which is also known as a thermoset and which is irreversibly hardened from an extruded viscous liquid prepolymer or resin. The support structure 88 is generally removed after final curing of the 3D-printed rubber body. According to FIG. 16, the completed rubber part 12 is shown printed right on top of a support structure 88. The support structure 88 can also be used as a printed shell for the rubber part 12 (FIG. 1) in order to achieve a further increased stability and dimensional accuracy thereof. The layer thickness of the support structure 88 may be less than the thickness of the rubber layer for highest accuracy, with the required number of support layers preferably printed right before the next rubber layer.

Figure 17:
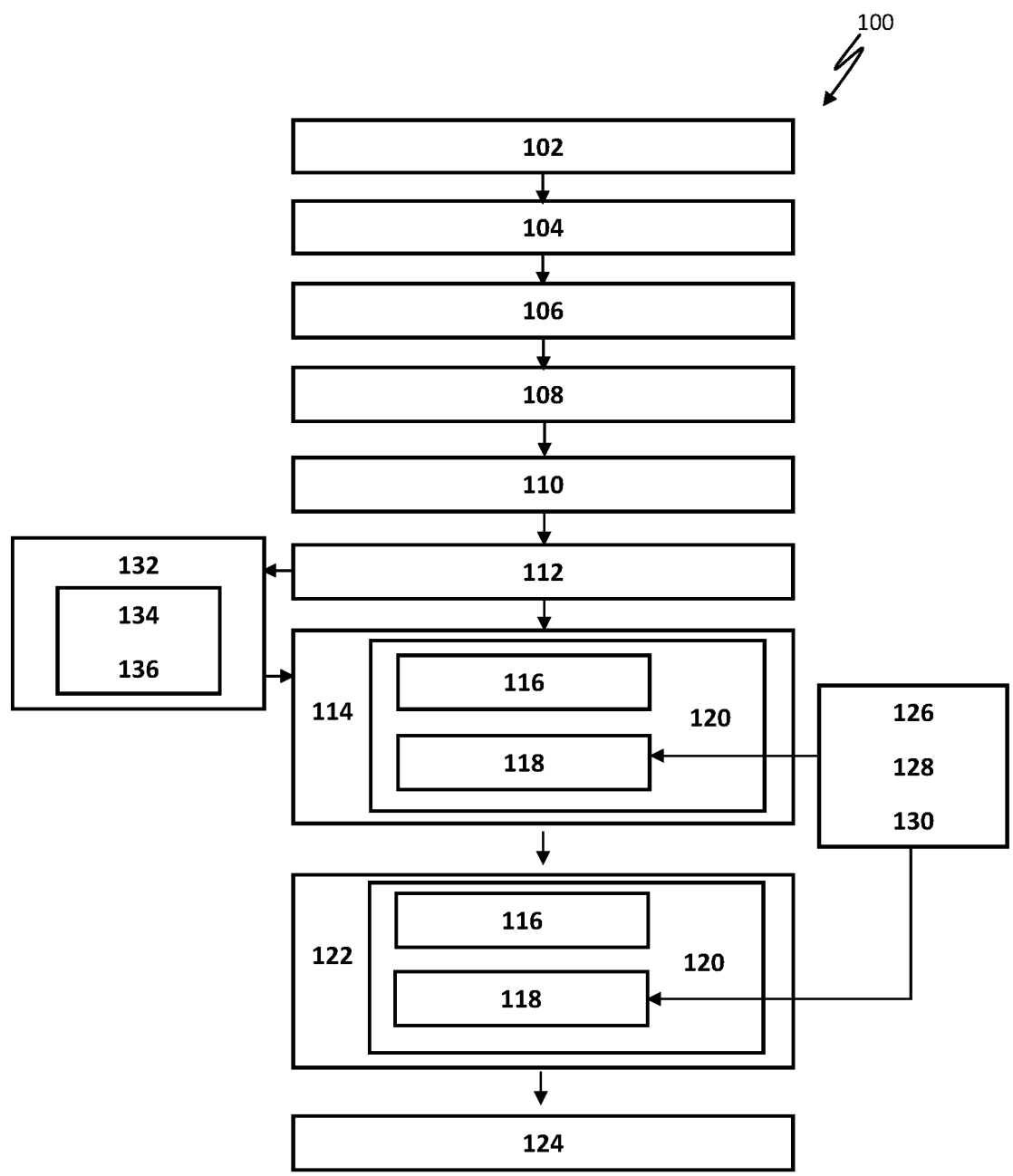
FIG. 17 shows a block diagram of a Method of 3D-printing an elastically deformable rubber body using a 3D-Printer system as depicted in FIGS. 1 to 16.

A Method 100 of 3D-printing an elastically deformable rubber body 12 according to the invention using a 3D-Printer system 10 as depicted above is described with further reference to FIG. 17. The method 100 comprises the following steps:

providing 102 uncured raw rubber R in the form of strips, pellets or the like;

feeding 104 the uncured raw rubber R to the extruder 14 via the inlet opening 36;

heating 106 the uncured raw rubber R within the extruder by application of heat and mixing 108 the heated rubber in the extruder 14;

partially curing 110 the heated raw rubber R within the extruder 14;

heating 112 the print bed 16;

forming 114 a first layer 76a of partially cured rubber r by extruding 116 partially cured rubber r over the nozzle 50 of the extruder 14 and depositing 118 the extruded partially cured rubber r (directly or indirectly) on the print bed 16 while moving 120 the extruder 14 and the print bed 16 in a pre-set direction 78 relative to one another; printing 122 subsequent layers 76b, 76c, . . . 76n of partially cured rubber r by extruding 116 further partially cured rubber r over the nozzle 50 and depositing 118 the extruded rubber on top of the respective immediately preceding layer 76a, 76b, 76c, . . . , 76n of rubber when moving the nozzle 46 and the print bed 16 relative to one another at a pre-set distance 80, wherein the distance 80 is such that the newly extruded rubber is mechanically squashed into the respective immediately preceding layer 76 of rubber; further curing 124 each of the rubber layers 76a, 76b, 76c, . . . , 76n once deposited on the print bed to a desired, that is preset state of cure of the 3D-printed rubber body 12 on the print bed 16.

The said method of 3D-printing allows building cavity-free rubber parts 12 layer-by-layer which show mechanical characteristics, in particular a mechanical strength, and a dimensional accuracy comparable to that of a corresponding injection-molded rubber part. The rubber may be, for instance any nitrile-based rubber (NBR/HNBR) known to a person skilled in the art or other types of rubber, as, for instance, a fluororubber (FKM), an ethylene propylene diene monomer rubber (EPDM), an alkyl acrylate copolymer rubber (ACM) or an ethylene acrylic rubber (AEM).

The method may further comprise advancing 126 the extruder 14 towards the print bed 16 (in the direction of the Z-axis), at the very end of printing each layer 76 on the print bed 16. Step 126 is advantageously made before or right when interrupting 128 the extruding (116 of the partially cured rubber r is and before retracting 130 the extruder 14 away (in the direction of the Z-axis) from the print bed 16 to bring it into position for printing of the next layer 76b, 76c, . . . , 76n. Thereby, an unwanted deformation of the newly deposited layer and/or respective immediately preceding layer of partially cured rubber r can be prevented. More importantly, an unwanted dehiscence of the newly deposited layer 76a, 76b, 76c, 76n of partially cured rubber from the print bed 16 or the respective immediately preceding layer 76a, 76b, 76c, . . . , 76n of partially cured rubber r upon moving the extruder 16 away from the print bed 16 can be prevented.

Further, the 3D-printing method 100 may comprise the step of creating 132 a support structure 88 by 3D-printing 134 of a thermoplastic material or a thermoset directly or indirectly on the print bed and hardening 136 it. This allows for a wide geometric range of 3D-printable elastomerically deformable rubber parts 12. Of note, step 132 can be performed before and/or after step 114.

What is claimed is:

1. A method of 3D-printing an elastically deformable rubber part using a 3D-Printer system, the method comprising the steps of:

providing an extruder having a housing with an inlet opening and a nozzle, the extruder comprising first heating means for heating an uncured raw rubber fed to the extruder;

providing a print bed with second heating means;

providing a driving means for moving the extruder and the print bed relative to one another;

providing an electronic control for the extruder and the second heating means of the print bed, wherein the electronic control is adapted to control the extruder and the first heating means such that the uncured raw rubber is partially cured within the extruder;

providing the uncured raw rubber in the form of strips or pellets;

feeding the uncured raw rubber to the extruder via the inlet opening;

heating the uncured raw rubber within the extruder by application of heat from the first heating means and mixing the heated rubber within the extruder;

partially curing the heated raw rubber within the extruder;

heating the print bed with the second heating means;

forming a first layer of partially cured rubber by extruding the partially cured rubber over the nozzle of the extruder and depositing the extruded partially cured rubber on the heated print bed while moving the extruder and the print bed relative to one another with the driving means;

printing subsequent layers of the partially cured rubber by extruding further partially cured rubber over the nozzle and depositing the extruded partially cured rubber on top of a respective immediately preceding layer of the partially cured rubber while moving the nozzle and the print bed relative to one another at a pre-set distance with the driving means, wherein the pre-set distance is such that the extruded partially cured rubber forming the subsequent layers is mechanically squashed into the respective immediately preceding layer of the partially cured rubber;

further curing each of the first and subsequent rubber layers once deposited on the print bed and to a desired state of cure on the print bed; and advancing the extruder towards the print bed at the very end of printing each of the first and subsequent layers on the print bed, wherein the advancing is made right before or when interrupting extruding of the partially cured rubber.

2. The method according to claim 1, wherein the advancing of the extruder is made right before interrupting extruding of the partially cured rubber.

3. The method according to claim 2, further including the step of creating a support structure for one or more of the first and subsequent layers of the partially cured rubber by printing and hardening a thermoplastic material or a thermoset on the print bed.

4. The method according to claim 1, further including the step of creating a support structure for one or more of the first and subsequent layers of the partially cured rubber by printing and hardening a thermoplastic material or a thermoset on the print bed.

* * * * *